April 24, 1956     H. K. KIESER     2,742,879
STABILIZING DEVICE FOR GOVERNOR SYSTEMS, ESPECIALLY
SPEED GOVERNOR SYSTEMS WITH YIELDABLE
FOLLOW-UP MECHANISM
Filed March 31, 1953
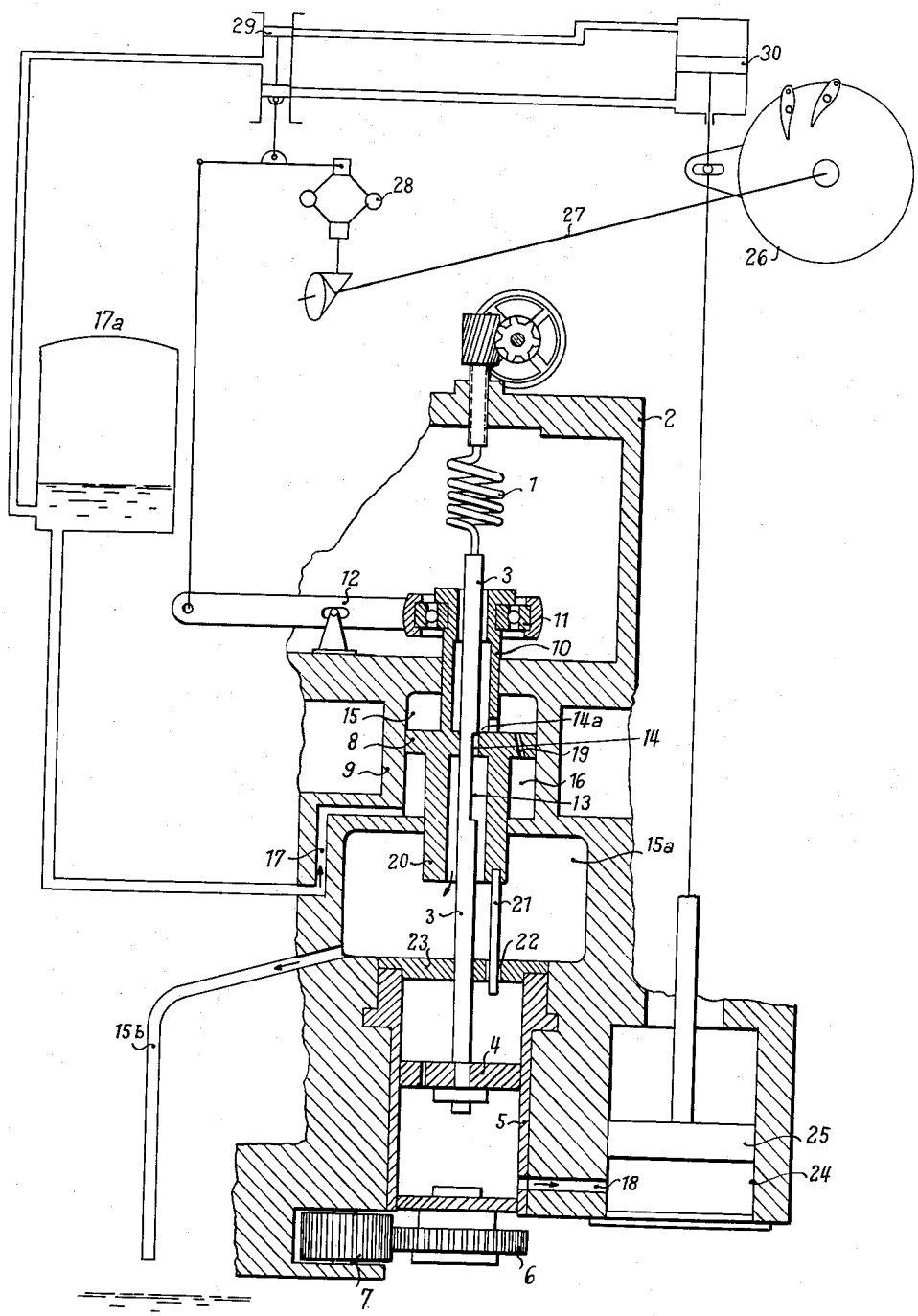

United States Patent Office 2,742,879
Patented Apr. 24, 1956

2,742,879

STABILIZING DEVICE FOR GOVERNOR SYSTEMS, ESPECIALLY SPEED GOVERNOR SYSTEMS WITH YIELDABLE FOLLOW-UP MECHANISM

Hugo K. Kieser, Heidenheim, Germany, assignor to J. M. Voith G. m. b. H., Maschinenfabrik, Heidenheim, Germany Application March 31, 1953, Serial No. 346,001

Claims priority, application Germany April 3, 1952

7 Claims. (Cl. 121—42)

The present invention relates to stabilizing devices for governor systems and, more particularly, to stabilizing devices for speed governor systems with yieldable follow-up mechanism.

For stabilizing control actions of governor systems which require great stability, it is most common to employ an oil brake (dashpot) which in connection with a return spring as yieldable link is built into the follow-up mechanism of the control. The great precision in the control action nowadays required with such controls, makes necessary a design with which any lost motion whatsoever in the joints of the control mechanism will be avoided. Furthermore, in order to minimize hunting, care has to be taken that the oil brake piston absolutely accurately returns into its respective resting position.

The hunting free resting of the control in the state of equilibrium can be obtained most reliably if the end force or power of the return spring at the completion of a controlling step reaches the value zero. It will be obvious, therefore, that also the returning forces, which from the motive system of the yieldable return mechanism are conveyed to the return members of the governor, must have values only around zero.

With governor systems working with sleeve return mechanism it is generally the practice in order to obtain a precise adjustment of the relative intermediate position of the yieldable return, to employ valves for controlling the oil brake, in which instance the return spring in the state of equilibrium of the control device will have a positive end force. Such a device is generally sufficient for an adjusting precision within a tolerance of a few tenths percent of a change in the speed of rotation. However, such device fails completely, as experience has shown, in such instances in which the adjustment must be effected at an assured precision of less than 0.1%. This failure is due to the fact that the play of the forces in the oil brake with the smallest possible tolerance about the central position cannot be mastered any longer by these control means. Such a problem occurs for instance in connection with the precise maintenance of the frequency in large inter-connected networks or also when controlling the power transfer in such networks linked by low-powered coupling supply lines.

It is, therefore, an object of the present invention to provide a stabilizing device for governor systems, especially speed governor systems with yieldable return, which will overcome the above mentioned drawbacks.

It is another object to provide a stabilizing device of the type set forth in the preceding paragraph, which will make it possible to maintain the frequency of large inter-connected networks with highest precision or to control properly the power-transfer between such networks.

It is also an object of this invention to provide a stabilizing device for governor systems, especially speed governor systems with yieldable return, which will make it possible to effect a speed control within precision limits of less than 0.1%.

These and other objects and advantages of the invention will appear more clearly from the following specification in connection with the accompanying drawing showing a longitudinal section through a stabilizing device according to the present invention and a diagram showing the working of the stabilizing device in conjunction with the governor system.

General arrangement

According to the present invention, there is provided a stabilizing device for use in connection with governor systems with yieldable follow-up mechanism which is characterized in that the yieldable follow-up mechanism comprises an oil brake plunger, a follow-up valve member, and a return spring having said valve member suspended thereon, which spring is so suspended that in the intermediate position of said plunger said spring can relax to zero. In addition thereto, the valve member is connected with return members of the governor by a servomotor, amplifier or booster mechanism in such a manner that no reactive forces will be conveyed from said return members and elements connected thereto to said valve member. According to a particularly advantageous arrangement, a hydraulic servomotor is used, while preferably the connecting link between the return spring and the oil brake plunger is designed as control valve means for the hydraulic servomotor. To this end, the servomotor is arranged around the control valve means and concentric with regard to the latter.

The hydraulic servomotor may consist of a piston adapted to move in response to a differential pressure acting thereupon, while a first throttle opening (cataract) of constant cross section interconnects the two opposite sides of said last mentioned piston, and while a second throttle opening is formed and controlled by the relative movements between the control valve means and said piston.

In order to increase the accuracy of the adjusting movements of the stabilizing device and to eliminate the comparatively high friction of rest, there is in a well known manner provided a device which causes rotation of the oil brake cylinder around its axis. The piston of the hydraulic servomotor is preferably rotatably connected to the oil brake cylinder, so that the piston also participates in the rotary movement. The drive for the rotary movement of the brake cylinder and of the piston is advantageously effected by an oil pressure motor. This oil pressure motor is supplied with pressure oil from the governor system, so that a reliable operation of the oil pressure motor is always ensured, when the governor system is in operation.

Structural arrangement

Referring now to the drawing in detail, the stabilizing device shown therein comprises a casing 2 which houses a return spring 1. The upper end of the return spring 1 is held stationary with regard to the casing, but in order to allow varying of the speed of rotation, the fixed point may be adjusted in height by an adjusting device of any desired type.

The lower end of spring 1 has connected thereto the upper end of a cylindrical pin or follow-up valve member 3, while the piston 4 of an oil brake is connected to the lower portion of valve member 3. The cylinder 5 of the oil brake is rotatably journalled in the casing 2 and is provided with a gear ring 6 through the intervention of which cylinder 5 may be rotated, e. g., by means of an oil pressure motor 7.

Valve means or valve member 3 extends through a piston 8 which latter is concentric with valve member 3, said piston 8 being slidable in a stationary cylinder 9. Piston 8 has an upwardly directed extension 10 in form of a sleeve which by means of an anti-friction bearing 11 is operatively connected to the return lever 12.

Valve member 3 is provided with a cut-out portion 13 which portion forms a control edge 14a for the passage 14 (variable throttle opening) controlling the discharge of fluid from the upper cylinder space 15 through passage 14 into the chamber 15a from where the fluid is discharged through passage 15b into a pressure-free oil container. Lower cylinder space 16 is connected through a passage 17 to a pressure fluid source which in the given example is formed by a pressure tank 17a. The two piston sides communicate with each other through a constant throttle opening 19 (cataract).

Piston 8 is furthermore provided with a downwardly directed extension 20 into which is inserted a follower pin 21 adapted to extend into and through a bore 22 of a cover 23, which forms the top wall of the braking cylinder 5, thereby rotatably interconnecting the braking cylinder 5 and the power piston 8.

Brake cylinder 5 communicates through passage 18 with the lower portion of a cylinder 24. This cylinder accommodates displacement piston 25, which in its turn is connected to the member to be adjusted by the governing assembly, in the given example this member is a control ring 26 of a water turbine.

The drawing also shows a diagrammatic representation of the remaining members of the complete governor assembly to illustrate its interaction with the stabilizing device, which is the object of the invention. Turbine shaft 27 drives pendulum governor 28, which through rods acts on a valve spool 29 of a distributing valve (pilot valve) and thus controls the pressure fluid flow from pressure tank 17a to guide vane servomotor 30. Return lever 12 transmits through rods the return movement of the governing system to the valve spool 29 of the distributing valve.

From the above it will also be obvious that no reaction forces can be conveyed from the elements 10, 11 and 12 to the control valve member 3.

*Operation*

When the speed of the turbine decreases, pendulum governor 28 moves valve spool 29 upwardly and thus allows the pressure fluid to flow from pressure tank 17a to the upper cylinder portion of guide vane servomotor 30. The guide vane servomotor now adjusts the guide vanes in the opening direction; at the same time the servomotor displaces displacement piston 25 downwardly. The oil thereby displaced from cylinder 24, forces piston 4 of the oil brake with valve member 3 upwardly, which causes enlargement of the throttling cross-sectional area at control edge 14a between the differential piston 8 and valve member 3. This results in a pressure decrease inside pressure compartment 15, so that differential piston 8, which is subjected from below to the pressure of the pressure oil, follows valve member 3 upwards until control edge 14a again occupies the original relative position with respect to the piston 8. This movement of piston 8 is transmitted to valve spool 29 through sleeve 10, antifriction bearing 11 and return lever 12, so that valve spool 29 is restored to its intermediate position.

Simultaneously with and partly subsequent to the above described operations, return spring 1, which has now been preloaded, becomes effective and moves valve member 3 with brake piston 4 downwardly to the original initial position due to the throttle opening in brake piston 4 until return spring 1 is completely relaxed. This movement, through servomotor 8, 9 and return members 10, 11, 12, causes a fresh upward travel of valve spool 29 and hence a further opening of the guide vanes to such an extent that the original turbine speed is restored with a guide vane opening corresponding to the new load on the turbine.

It is, of course, understood that the present invention is by no means limited to the particular construction shown in the drawing but also comprises any modification within the scope of the appended claims.

What I claim is:

1. A stabilizing device for governor systems, especially speed governor systems with yieldable follow-up mechanism, which comprises in combination: return means, spring means having one end thereof held stationary, a follow-up valve member freely suspended from the other end of said spring means and adapted to move over a predetermined distance, the thrust of said spring means being such that said spring means is relaxed when said follow-up valve member occupies its intermediate position, an oil brake cylinder-piston assembly having the movable member thereof connected to said follow-up valve member, and servomotor means having a movable element for cooperation with said follow-up valve member to control the movement of said return means, said movable element being positively connected with said return means, and said follow-up valve member being movable independently of and relative to said movable element of said servomotor means whereby said follow-up valve member is free from reactive forces of said return means.

2. In a stabilizing device for governor systems, especially speed governor systems with yieldable follow-up mechanism, which includes a control member for controlling the adjustment of an element, the combination of: return means operatively connected to said control member, a reciprocable follow-up valve member, spring means having one end thereof held stationary and having the other end thereof connected to one end portion of said follow-up valve member, the thrust of said spring means being such that said spring means is relaxed when said follow-up valve member occupies its intermediate position, an oil brake cylinder-piston assembly including a movable member connected to the other end portion of said follow-up valve member, and a hydraulic servomotor concentrically arranged with regard to said follow-up valve member and adapted to be controlled thereby, said servomotor including a movable element positively connected with said return means, and said follow-up valve member being movable independently of and relative to said movable element of said servomotor whereby said follow-up valve member is free from reactive forces of said return means.

3. A stabilizing device for governor systems, especially speed governor systems with yieldable follow-up mechanism, which comprises in combination: return members, a reciprocable control valve member, spring means having one end thereof held stationary and having the other end thereof connected to one end portion of said control valve member, the thrust of said spring means being such that said spring means is relaxed when said control valve member occupies its intermediate position, an oil brake cylinder-piston assembly including a movable member connected to said control valve member, a hydraulic servomotor including a differential piston concentrically arranged with regard to said control valve member and having a constant throttle opening which governs the fluid communication between the differential piston areas of said differential piston, and a variable throttle opening between one of said differential piston areas and a pressure-free area, said variable throttle opening being formed by said differential piston and said control valve member.

4. In a stabilizing device for governor systems, especially speed governor systems with yieldable follow-up mechanism, which includes control means for controlling the adjustment of an element, the combination of: return means operatively connected to said control means, a follow-up valve member, spring means having one end thereof held stationary and having the other end thereof connected to one end portion of said follow-up valve member, the thrust of said spring means being such that said spring means is relaxed when said follow-up valve member occupies its intermediate position, an oil brake cylinder-piston assembly having the piston thereof connected to the other end portion of said follow-up valve member, means operatively connected with the cylinder of said oil brake cylinder piston assembly and operable to turn said cylinder about its axis, and servomotor means including a differential piston for cooperation with said follow-up valve member, said differential piston being positively connected with said return means, and said follow-up member being movable independently of said servomotor means whereby said follow-up valve member is free from reactive forces of said return means.

5. A stabilizing device according to claim 4, which includes an oil pressure motor drivingly connected to said oil brake cylinder for rotating the same.

6. A stabilizing device for governor systems, especially speed governor systems with yieldable follow-up mechanism, which comprises in combination: return members, a reciprocable control valve member, spring means having one end thereof held stationary and having the other end thereof connected to one end portion of said control valve member, the thrust of said spring means being such that said spring means is relaxed when said control valve member occupies its intermediate position, an oil brake cylinder-piston assembly having the piston thereof connected to the other end portion of said control valve member, means operable to turn the cylinder of said oil brake cylinder piston assembly about the axis of said cylinder, a hydraulic servomotor including a differential piston concentrically arranged with regard to said control valve member and having a constant throttle opening which governs the fluid communication between the differential piston areas of said differential piston, a variable throttle opening between one of said differential areas and a pressure-free area, said variable throttle opening being formed by said differential piston and said control valve member, and coupling means rotatably interconnecting said differential piston and said oil brake cylinder.

7. In a stabilizing device for governor systems: a pressure fluid source, a governor, fluid pressure responsive means, valve means operatively connected with said governor and arranged to control the supply of pressure fluid from said pressure fluid source to said fluid pressure responsive means and vice versa, means operatively connected to said fluid pressure responsive means for adjustment thereby, a hydraulic oil brake cylinder-piston assembly hydraulically connected to said fluid pressure responsive means and including a hydraulically movable member, a follow-up valve member having one end thereof connected to the hydraulically movable member of said oil brake cylinder-piston assembly, a spring having one end arranged stationarily and having its other end connected to the other end of said follow-up valve member, hydraulic servomotor means including a differential piston surrounding said follow-up valve member and arranged for cooperation therewith, and a lever system operatively connected with said differential piston and with said valve means.

References Cited in the file of this patent
UNITED STATES PATENTS

| | | |
|---|---|---|
| 1,423,786 | Zoelly | July 25, 1922 |
| 2,075,968 | Heydekampf | Apr. 6, 1937 |
| 2,227,427 | Ehrhart | Jan. 7, 1941 |

FOREIGN PATENTS

| | | |
|---|---|---|
| 409,277 | France | Feb. 14, 1910 |
| 114,836 | Great Britain | 1919 |
| 340,402 | Germany | Sept. 10, 1921 |
| 654,396 | Germany | Dec. 17, 1937 |